Dec. 11, 1956 E. A. R. MATHIAS 2,773,433
SUCTION BOX HAVING ROLLER FACE
Filed Dec. 11, 1952 4 Sheets-Sheet 1
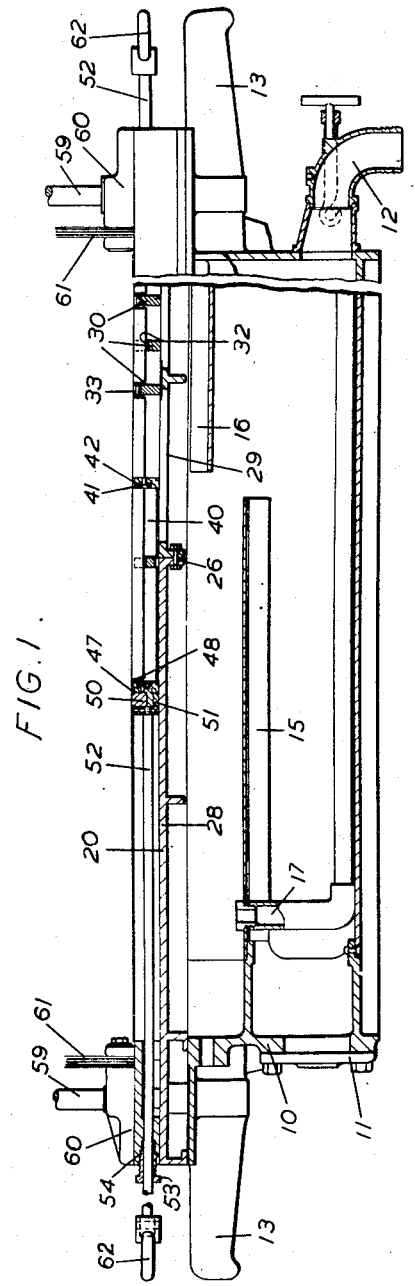
Inventor
Ernest A. R. Mathias
By Young, Emery + Thompson
Attorneys

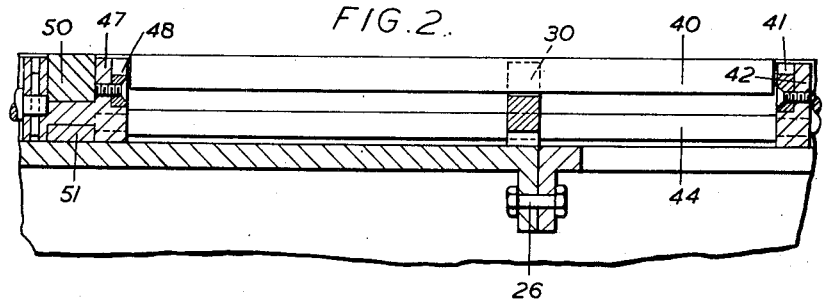
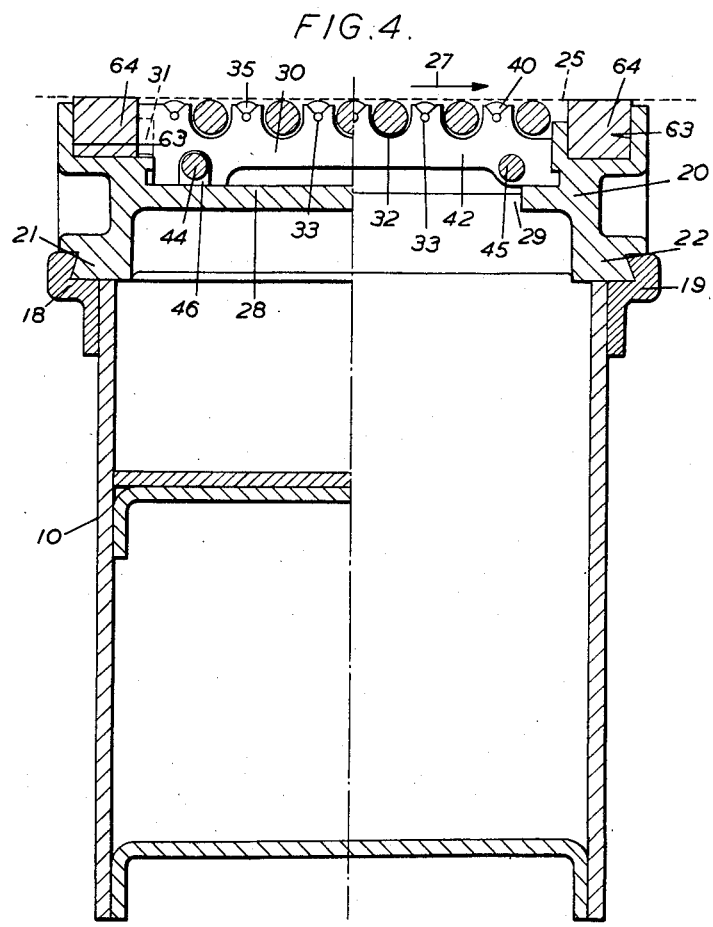

Dec. 11, 1956  E. A. R. MATHIAS  2,773,433
SUCTION BOX HAVING ROLLER FACE
Filed Dec. 11, 1952  4 Sheets-Sheet 3
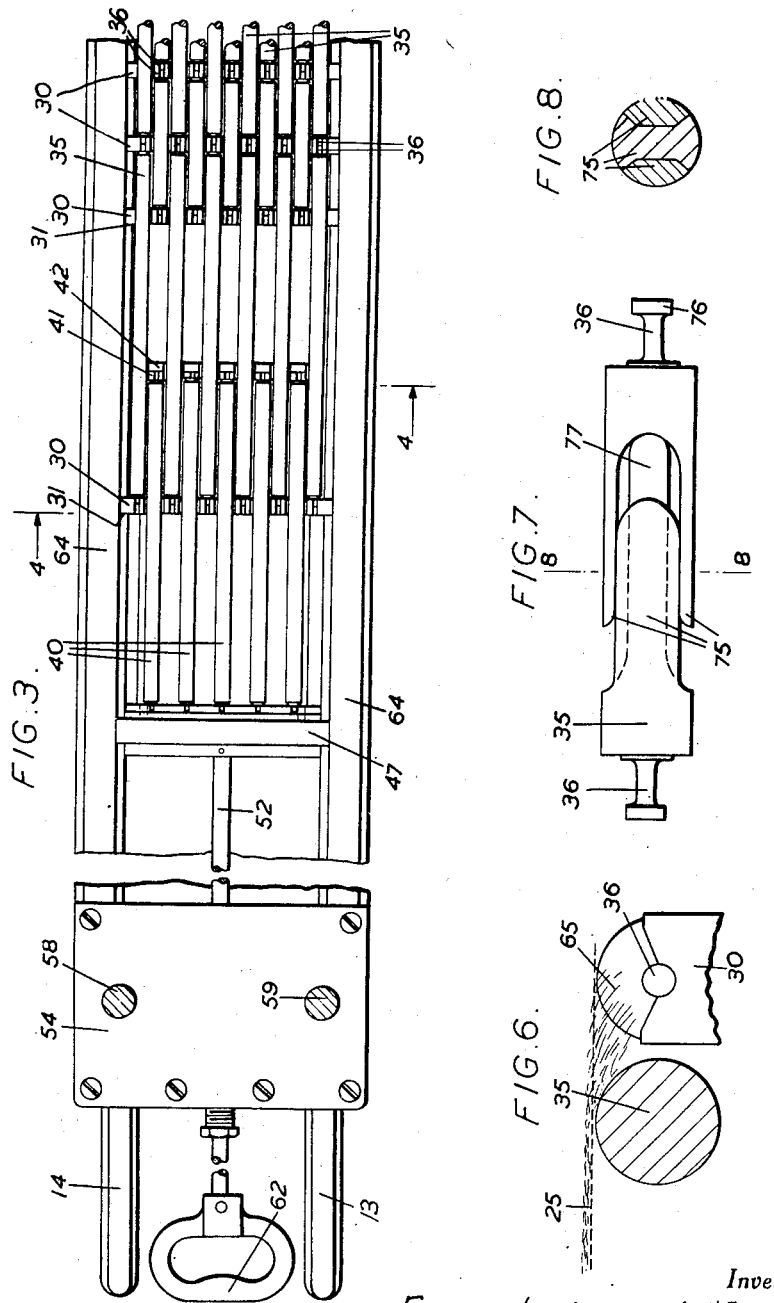
Inventor
*Ernest A. R. Mathias*
By
*Young, Emery & Thompson*
Attorneys Dec. 11, 1956   E. A. R. MATHIAS   2,773,433
SUCTION BOX HAVING ROLLER FACE
Filed Dec. 11, 1952   4 Sheets-Sheet 4

Inventor
Ernest A. R. Mathias
By
Young, Emery & Thompson
Attorneys

United States Patent Office 2,773,433
Patented Dec. 11, 1956

2,773,433

SUCTION BOX HAVING ROLLER FACE

Ernest A. R. Mathias, Newport, England, assignor of one-half to Alfred Robertson, London, England Application December 11, 1952, Serial No. 325,496

Claims priority, application Great Britain December 13, 1951

3 Claims. (Cl. 92—51)

This invention relates to methods of and means for applying a reduced pressure or vacuum to a web or layer of material to be treated for example for removing liquid from the material. The term "web" hereinafter used is intended to mean a layer of material to be treated and/or a supporting belt therefor. The invention is more particularly but not solely intended for the removal of water from a layer of fibres in the manufacture of paper. In paper making machines the layer of water and fibres supported on a woven wire belt passes rapidly over a series of spaced vacuum boxes whereby much of the surplus water is removed. The web comprising the layer and the belt commonly move at high speed as a result of which the metal belt is subject to friction over the tops of the vacuum boxes and the belt is worn out in a comparatively short period and is a very expensive piece of equipment to replace. With a view to overcoming this difficulty the provision of a perforated moving rubber belt having a part disposed in a horizontal plane between the tops of the vacuum boxes and the metal belt has been considered and while being successful to a certain degree has not been successfully adapted for very wide and high speed machines.

According to the invention we provide a method which comprises supporting the web on a series of substantially parallel lines formed by rotatably mounted rollers, said lines being transverse to the direction of movement of the belt and spaced apart lengthwise of the belt between which lines the belt is out of contact with any supporting surfaces and between which reduced pressure is applied. These lines of support may each consist of a number of spaced lines staggered in relation to the adjacent lines.

The invention also comprises means for carrying out this method comprising a series of rollers disposed in parallel lines transverse to the direction of movement of the web, and rotatably mounted in bearings in a frame free from web supporting surfaces between the rollers which frame is adapted to be maintained under reduced pressure.

The rollers are preferably arranged in parallel rows, each row being divided into at least several rollers supported on bearings disposed at spaced distances across the web.

The rollers may be short, e. g. 1 to 8 inches so that from five to a hundred or more extend in axial alignment across the width of the web, and the rollers run freely in suitable bearing blocks. The rollers may be stainless steel or of any other suitable material or compound of materials such that the axles run in a bearing block of co-related low frictional value material, and may be from three eighths of an inch up to two inches diameter or in some cases larger or smaller. The precise diameter and length may be selected according to the applied load, the operative speed, the machine width and the practical considerations of manufacture. The rollers stand up above the bearing blocks and support the metal belt and the latter drives the rollers with very little friction. These bearing blocks may be made of material that requires as a lubricant or coolant the liquid which is to be removed from the web, e. g. plastics material such as laminated fabric impregnated with a phenol formaldehyde resin for lubrication by the water removed from the web. The blocks may also be lubricated by water or other liquid fed from suitable containers. The rollers may be arranged in substantially parallel rows across the web, the rollers of one row being staggered in relation to the rollers of other rows whereby the metal belt is supported over the bearings between the rollers. The width of the bearing blocks is preferably such that the spacing between the ends of the rollers axially is no greater than the distance between the uppermost generatrices of adjacent rollers. The rollers are preferably spaced from each other at adjacent generatrices from 0.01 inch to 0.2 inch. The exact spacing may be selected according to the diameter and length of the rollers used, the loading to be applied, and the machine speed.

The invention provides saving in horse power, and enables greater degree of vacuum to be applied with consequent greater removal of water in this relatively cheap stage of the process.

A constructional form of the invention will now be described by way of example in relation to a vacuum box for a paper making machine with reference to the accompanying diagrammatic drawings wherein:

Figure 1 is a view partly in side elevation and partly in section of a vacuum box made in accordance with the invention;

Figure 2 is a part of Figure 1 on an enlarged scale;

Figure 3 is a plan view of one end thereof (the other end plan being identical) some supporting elements of known construction shown in Figure 1 being however omitted from Figure 3;

Figure 4 is a cross-sectional view on the line 4—4 of Figure 3 but on an enlarged scale;

Figure 6 is a detail to be described;

Figure 7 is an elevation of a modified form of roller; and

Figure 8 is a cross-sectional view on the line 8—8 on Figure 7.

Figure 5:
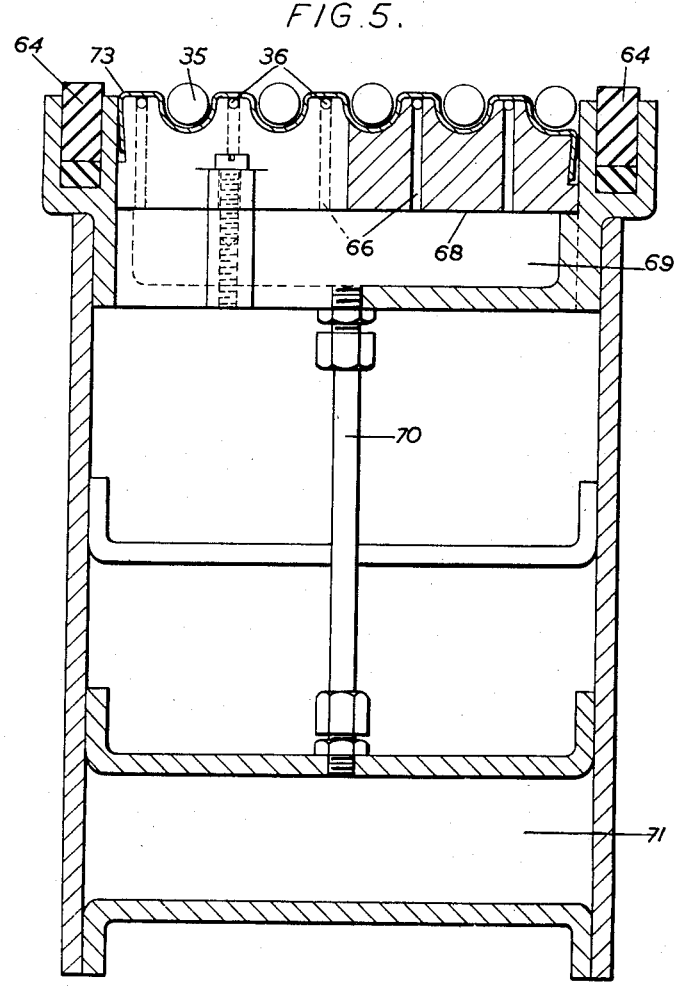
Figure 5 is a cross-sectional view of a vacuum box of modified construction.

Referring first to Figures 1 to 4, the lower part of the vacuum box is in this case of known construction and comprises a hollow box-like frame 10, end closing plate 11, connection 12 for attachment to a vacuum pump, handles 13, 14 at each end, baffle 15, reinforcing rib 16, water draining pipe 17, and dovetail guide ribs 18, 19 (Figure 4).

In this case there is described the adaptation of the invention to an existing vacuum box using a timber top.

The timber top is removed from the known vacuum box and in accordance with the present invention the following parts are substituted:

A top frame 20 has guides 21, 22 engaging in the guide ribs 18, 19. This frame extends integrally across the box frame 10 in the direction of movement of the wire belt (part of which is shown at 25 in Figure 4) but transversely of the belt is made a number of parts bolted together as at 26 Figure 1. The direction of movement of the belt is shown by arrow 27, Figure 4. The box frame 10 and top frame 20 when in use together form a complete boxlike frame. The end parts of the top frame are of closed (not apertured) construction but the other parts are open, this being seen in Figures 1 and 4, the part 28 being closed and the part 29 being open.

At the open part of the top frame it carries a number of bearings of plastics material in the form of cross-members or bridges 30 the ends of which are mounted in the top frame and are fixed therein cross-wise of the belt by dropping into slots 31 in the top frame. These fixed bridges are shaped at their upper edges with recesses 32 alternating with open topped bearing recesses 33. Axially fixed rollers 35 have integral end spindles 36 which drop into the bearing recesses 33 while the rollers run free in the recesses 32. The bridges are of alternating construction in that the bearing recesses 33 of one bridge are in line with the recesses 32 of the next bridge and in line with the recesses 33 of the next but one bridges. Thus the rollers are staggered in such manner that the belt unsupported over one bearing recess 33 is carried on either side of it by adjacent rollers. The recesses 33 are cut V-shaped at the top so that water from the paper web falls into the recesses and serves as lubricant.

The end rollers 40 are adjustable for varying the deckle or width of the applied suction to conform with any desired width of paper web in production. For this purpose (referring to one end only of the vacuum box since the other end is the same) their inner ends are carried by a bearing bridge 41 of plastics material which is fixed on a movable metal bridge 42 that is fixed to the inner ends of a pair of rods 44, 45. The outer fixed bridges 30 are cut away as at 46 (Figure 4) to receive these rods freely. The outer ends of these rods are connected to a slidable metal bridge 47 that carries bearing bridges 48 and upper and lower rubber sealing strips 50, 51 the upper of which forms a vacuum seal on the belt and the lower of which forms a vacuum seal on the closed part 28 of the top frame. This bridge 47 is connected to the inner end of a rod 52 that is slidably mounted in a bearing plug 53 that is carried by a block 54 attached to the top frame by holding down bolts 58, 59. A suspension block 60 and supporting springs 61 of known construction are indicated in Figure 1 but are omitted from Figure 3. The rod 52 has a handle 62 on its outer end whereby it can be moved in or out thereby adjusting the end sealing bridge or bridges to the required deckle.

The top frame is also formed with grooves 63 to receive rubber strips 64 to effect a vacuum seal on the belt. The upper lines of contact of the rollers with the wire belt are in the same horizontal plane as the top of the strips 64. Alternatively other forms of resilient strips may be provided such as plastics strips urged upwardly by springs.

Figure 5 shows a modification in which the bridges are provided with ducts 66 leading to the spindles 36. The ducts communicate with a water container or header 69 to which water is supplied through a pipe 70 from a lower header 71 which is maintained full of water. The suction in the vacuum box causes the water to rise in the ducts and feed the bearings. A metal clip 73 is provided over the spindles 36, and a suitable packing ring 68 is provided to seal the header 69.

Figure 6 shows a construction of bearing somewhat further cut away to ensure that water 65 from the rollers will feed the bearings.

Figure 7 shows an alternative method of adjusting the deckle by forming some of the rollers, at the ends of the box, in a plurality of axially adjustable parts. This alternative method of adjustment has the advantage of keeping the unsupported length of the wire to a constant figure. The parts have co-acting fingers 75 which are shaped to make up the cylindrical shape of the roller. The spindles carry bosses 76 which fit in suitable bearings whereby they can be pushed and pulled to the required size. If desired the bosses 76 may be omitted and a light spring fitted in the space 77 to urge the roller elements apart.

Suitable means may be provided to prevent the axles 36 from being pulled off the bearing bridges and to prevent the parts of the roller from being separated by being pulled too far apart. The former effect is achieved by the bosses 76 or these may be replaced by springs and the second effect may be achieved by providing suitable stops such as bosses carried by rods which pass through holes in the bridges or in the rollers and limiting the movement apart of adjacent bridges or of the two parts of the roller. In a further alternative the axle 36 is fixed to the adjacent part of the next roller, stop rods or springs being again used to limit the movement apart of the roller parts.

Suitable means may be provided for adjusting the upper part of the box carrying the rollers for levelling purposes and for alignment of the bearings.

In another modification the fingers are of equal sector-shaped cross-sectional area, and in a further modification the fingers are omitted and one part of the roller has an axial pin slidably engaged in an axial hole in the other part.

If desired a vacuum box may be built up from a plurality of boxes disposed side by side i. e. the box may be divided transversely and/or longitudinally.

The rollers may be arranged to conform to a curvature transversely and/or longitudinally. Curvature across the web will tend to keep centralised and curvature longitudinally of the web may be used for guiding the web e. g. from the up run to a lower run of an endless belt in which case a number of boxes may replace one or more of the rolls around which the belt runs.

The invention provides an increased life of the metal belt due to the considerably reduced friction and at the same time ensures that the suction is applied to every part of the web whereby a wide range of suction including a high degree of suction may be used and the vacuum box may be fitted at any stage of the paper making process from the early low pressure box to a final box using the highest available suction without risk of affecting the paper structure. The invention also reduces the power required to drive the web and reduces the energy required to remove final traces of the water at a later and more expensive stage of the process, or the machine may be operated at higher speed.

I claim:

1. A suction box for applying a reduced pressure to a web of material comprising a box-like frame, a series of rollers disposed across the upper part of the box-like frame in parallel lines transverse to the direction of movement of the web, each line of rollers extending substantially completely across the frame, adjacent ends of rollers in each line being bridged by a roller in the next line, said rollers having end spindles thereon of less diameter than the rollers, said spindles being separate from those of other rollers so that each roller can rotate independently of the other rollers, said frame being adapted to be maintained under reduced pressure, at least five of said rollers being provided in each transverse line, said rollers having a diameter of between three eighths of an inch up two inches, the uppermost parts of the rollers being in the same plane as the sides of the box-like frame, a plurality of bearings for the roller spindles between the ends of each line, said bearings carrying said spindles in a freely rotatable manner, said bearings being supported only by means located below the rollers, slidably adjustable bearings for alternate rollers at the ends of the lines, upper and lower sealing strips carried by said adjustable bearings and extending across the frame, means for closing said end portions of the frame in the region of said last mentioned bearings but having the central portion of the frame open, and means for lubricating said bearings.

2. A suction box for applying a reduced pressure to a web of material comprising a box-like frame, a series of rollers disposed across the upper part of the box-like frame in parallel lines transverse to the direction of movement of the web, each line of rollers extending substantially completely across the frame, adjacent ends of rollers in each line being bridged by a roller in the next line, said rollers having end spindles thereon of less diameter than the rollers, said spindles being separate from those of other rollers so that each roller can rotate independently of the other rollers, said frame being adapted to be maintained under reduced pressure, at least five of said rollers being provided in each transverse line, said rollers having a diameter of between three eighths of an inch up to two inches, the uppermost parts of the rollers being in the same horizontal plane as the sides of the box-like frame, a plurality of bearings for the roller spindles between the ends of each line, said bearings carrying said spindles in a freely rotatable manner, said bearings being supported only by means located below the rollers, each bearing surface except the end ones carrying two adjacent spindles, said bearing surfaces being open topped so that the spindles at both ends of each roller can be dropped into them, and means for lubricating said bearings, the rollers of one row being staggered in relation to the rollers of the other rows so as to bridge over the gaps at the bearings.

3. A suction box as set forth in claim 2, wherein the bearings are chamfered to direct liquid from the web onto the spindles.

References Cited in the file of this patent

UNITED STATES PATENTS

| | | |
|---|---|---|
| 644,556 | Johnson | Feb. 27, 1900 |
| 989,195 | Sagar | Apr. 11, 1911 |
| 1,838,988 | Dickinson | Dec. 29, 1931 |
| 2,111,835 | Berry | Mar. 22, 1938 |
| 2,274,654 | Berry | Mar. 3, 1942 |

FOREIGN PATENTS

| | | |
|---|---|---|
| 66,946 | Germany | Feb. 28, 1893 |
| 277,384 | Germany | Aug. 12, 1914 |
| 679,800 | Germany | Aug. 12, 1939 |
| 98,903 | Sweden | May 14, 1940 |